United States Patent
Makwana et al.

(10) Patent No.: US 10,628,340 B2
(45) Date of Patent: Apr. 21, 2020

(54) METHOD FOR REORDERING OUT OF ORDER RESPONSES FROM DECOMPOSED REQUESTS IN BRIDGE IP

(71) Applicant: NXP USA, Inc., Austin, TX (US)

(72) Inventors: Prakashkumar G. Makwana, Austin, TX (US); Gus P. Ikonomopoulos, Lakeway, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/874,175

(22) Filed: Jan. 18, 2018

(65) Prior Publication Data
US 2019/0220423 A1 Jul. 18, 2019

(51) Int. Cl.
*G06F 13/16* (2006.01)
*G06F 13/42* (2006.01)
*G06F 13/364* (2006.01)
*G06F 13/40* (2006.01)
*G06F 13/28* (2006.01)

(52) U.S. Cl.
CPC ...... *G06F 13/1626* (2013.01); *G06F 13/1642* (2013.01); *G06F 13/364* (2013.01); *G06F 13/4027* (2013.01); *G06F 13/4282* (2013.01); *G06F 13/28* (2013.01); *G06F 13/4022* (2013.01); *G06F 2213/0026* (2013.01)

(58) Field of Classification Search
None
See application file for complete search history.

(56) References Cited

U.S. PATENT DOCUMENTS

| 9,021,482 | B2 | 4/2015 | Ganesh et al. |
| 2010/0318716 | A1 | 12/2010 | Nguyen |
| 2011/0107065 | A1 | 5/2011 | Ikonomopoulos et al. |
| 2012/0226841 | A1 | 9/2012 | Nguyen et al. |
| 2013/0042038 | A1* | 2/2013 | Byrne .................. G06F 13/362 710/113 |
| 2018/0063017 | A1* | 3/2018 | Beveridge ............... H04L 47/70 |

* cited by examiner

*Primary Examiner* — Henry Tsai
*Assistant Examiner* — Aurangzeb Hassan

(57) ABSTRACT

Upon receiving a request (203) in an initiator interface protocol identifying information to be returned in-order, an integrated circuit protocol bridge circuit device (200) allocates, to the ordered request, entries in a first ordered queue (e.g., 211) and a first static queue (e.g., 213) for the initiator interface protocol, generates a plurality of split target requests in a target interface protocol from the ordered request, and allocates the plurality of split target requests to entries in a second ordered queue (e.g., 217) and a second static queue (e.g., 218) for the target interface protocol, so that, upon receiving a plurality of out-of-order target responses, an allocated entry in the first ordered queue (211) for the first ordered initiator request is deleted only after a plurality of counter fields in the first static queue indicate that target responses have been received for all of the plurality of split target requests.

20 Claims, 9 Drawing Sheets

METHOD FOR REORDERING OUT OF ORDER RESPONSES FROM DECOMPOSED REQUESTS IN BRIDGE IP

BACKGROUND OF THE INVENTION

Field of the Invention

The present invention is directed in general to field of data processing devices and methods. In one aspect, the present invention relates to processing of information requests.

Description of the Related Art

A data processing device can include one or more peripheral interconnect devices to support the exchange of information with other data processing devices. To facilitate interoperability of data processing devices, manufacturers of data processing devices conventionally implement industry-standard interconnect technologies and associated protocols. One example of an industry-standard interconnect technology is the Peripheral Component Interconnect Express (PCI-Express or PCI-E) standard which is used in consumer, server, and industrial applications as to interconnect PCI-E devices over a point-to-point communications channel link between two PCI-E ports, allowing both ports to send/receive PCI-requests and interrupts. Another example of an industry-standard interconnect technology is the serial rapid input/output (SRIO) interface which is a packet-based protocol using a serial interface to provide data communication between SRIO controllers which process packets according to a command in the heading (WRITE, READ, etc.). Depending on the command, the packet data from incoming packets received by the SRIO controller will be processed or read/written from/to a memory by the serial interface controller. In the transmit direction, the packets may be prepared in a memory and a DMA unit may be programmed to deliver them to the SRIO controller for transmission. The SRIO architecture is a high-performance packet-switched, interconnect technology for interconnecting chips on a circuit board, and also circuit boards to each other using a backplane.

With different protocol requirements, challenges can arise with bridge IP circuits which convert transactions between protocols. For example, reference is now made to FIG. 1 which depicts a high-level block diagram of a bridge IP 10 which includes an initiator interface 11 and a target interface 20 for converting transactions from one protocol to another. The initiator interface 11 may include an initiator buffer 12 that receives first and second initiator requests IA, IB. Depending on the protocol requirements, the initiator interface 11 may convert the first received initiator request IA into a first target request TA that is stored in the transmit target buffer 22 for transmission as a first target request. However, a second received initiator request IB from the initiator buffer 12 may be split into multiple target requests TB0, TB1 which are stored in the transmit target buffer 22 for transmission as ordered target requests. For a variety of reasons, the target responses may be received out of order (e.g., TB1, TB0, TA). Though the responses for the two target requests TB0 and TB1 are received out of order, the initiator interface protocol 11 may restrict the responses to be received in the same order as requested, in which case the bridge IP 10 should combine both responses to form a single initiator response IB. In addition, the initiator interface protocol 11 may restrict responses to be in the same order as initiated (e.g., IA, IB). As will be appreciated, it is relatively straightforward to construct an ordered bridge IP 10 which does not split the initiator request and does not get response out of order, such as by using a simple FIFO to store and correlate requests REQ and responses RSP. However, such solutions cannot be used with protocols which allow requests to be split and/or which allow for out-of-order responses since simple FIFO-based solutions cannot readily be used to re-order out-of-order split responses. As seen from the foregoing, the existing bridge IP solutions are extremely difficult at a practical level by virtue of the challenge of converting between protocols, especially when out-of-order split responses must be re-ordered to meet the ordering requirements of the initiator requests.

BRIEF DESCRIPTION OF THE DRAWINGS

The present invention may be understood, and its numerous objects, features and advantages obtained, when the following detailed description of a preferred embodiment is considered in conjunction with the following drawings.

FIGS. 4-8 illustrate a sequence of example information values stored at the outbound ordered and static queues at incremental stages of illustrative read and write transactions received from the data processing device in accordance with selected embodiments of the present disclosure.

DETAILED DESCRIPTION

A bridge IP apparatus, system, and methodology are described for processing requests for information from a requesting device by storing the requests as entries in hardware queues which are constructed with ordered and static queue pairs to form a single logical queue which functions like a software queue structure where any entry can be accessed independent of the location in the queue, thus enabling out-of-order transaction handling by the hardware. By architecting the queue entry fields such that a single initiator request transaction can be co-related to multiple split target requests, the bridge IP supports converting an initiator request transaction from one protocol to another by splitting the initiator request to multiple target requests, and by processing target responses that may be received out of order. To this end, each target request may be assigned a unique transaction ID in a static queue, and each received target response transaction ID is compared against pending request queue entries to find matching transaction IDs. Once all the target responses from the split target requests are received, the pending initiator request is marked as "complete" in the ordered queue which stores pending initiator requests, and the initiator responses are then ordered within the queue and issued in order on the initiator interface.

Figure 1:
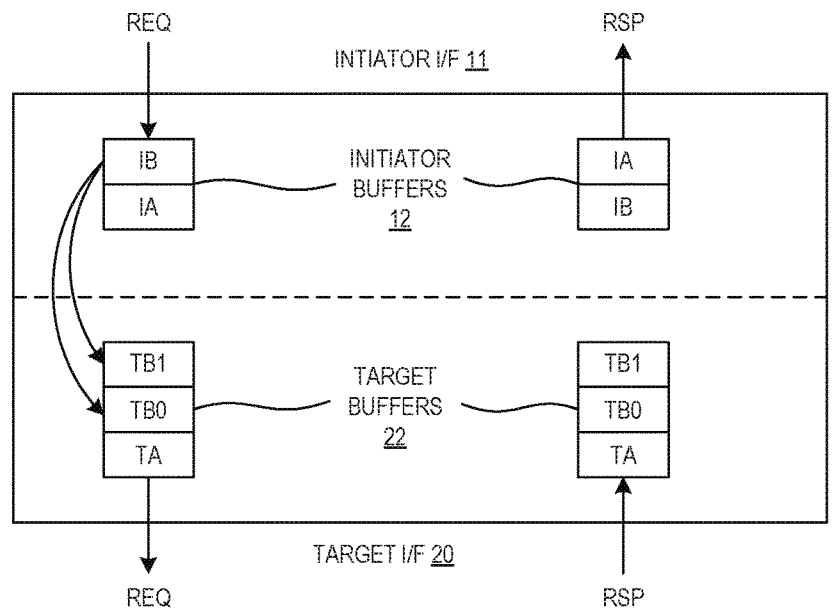
FIG. 1 is a high-level block diagram of a bridge IP which includes an initiator interface and a target interface for converting transactions from one protocol to another.
Figure 2:
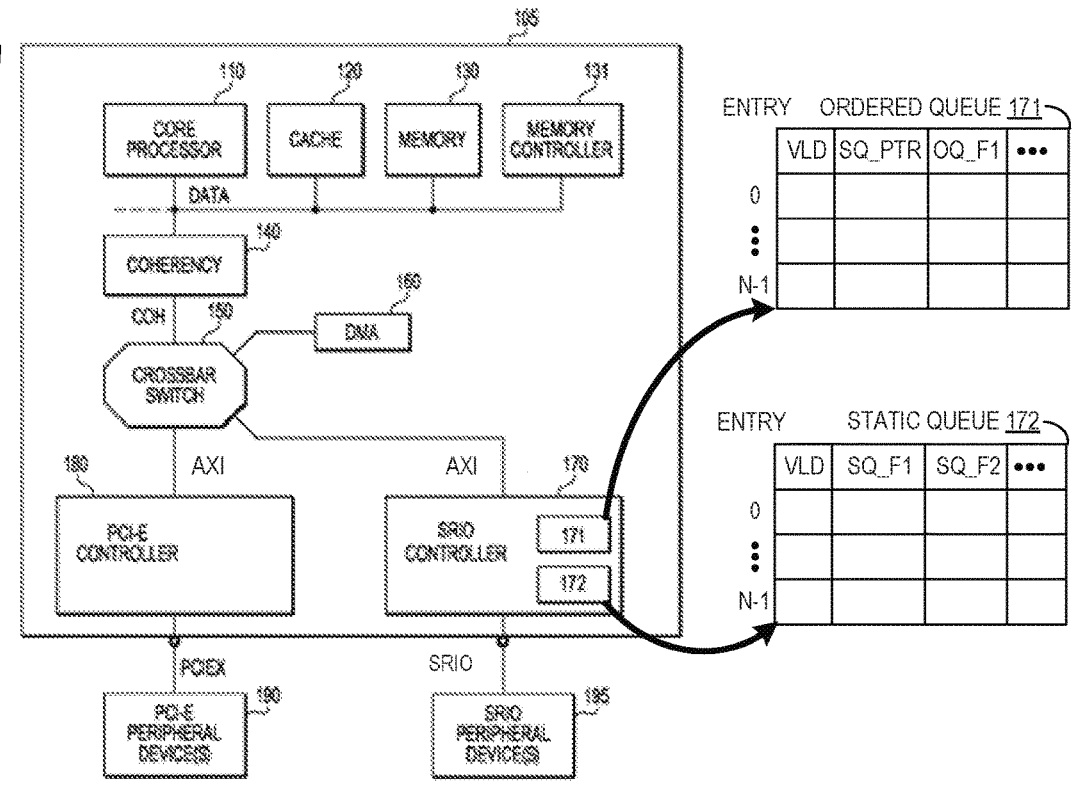
FIG. 2 is a block diagram illustrating a device including a data processing device which includes an SRIO compliant peripheral interconnect device in accordance with selected embodiments of the present disclosure.

To provide additional details for an improved understanding of selected embodiments of the present disclosure, reference is now made to FIG. 2 which depicts a block diagram illustrating a device 100 including a data processing device 105 that can be part of an integrated circuit. The device 105 includes an SRIO compliant peripheral interconnect device, e.g., SRIO controller 170 in accordance with selected embodiments of the present disclosure. Data processing device 105 further includes a core processor 110, a cache module 120, a memory module 130, and a memory controller 131 connected over a data bus to a coherency module 140, which in turn is connected over a crossbar switch 150 to a direct memory access (DMA) controller 160, a serial rapid input/output bus (SRIO) controller 170, and a PCI-E controller 180. As described more fully hereinbelow, SRIO controller 170 includes ordered and static queue pairs 171, 172 which are constructed to form a single logical queue which functions like a software queue structure where information requests are stored as entries that can be accessed independent of the location in the queue, thus enabling out-of-order transaction handling of split inbound or outbound SRIO requests. Data processing device 105 represents a computational device such as a microprocessor, a microcomputer, an embedded processor, and the like. Device 100 also includes a PCI-E peripheral device 190 connected to PCI-E controller 180 via a PCI-E bus, and a SRIO peripheral device 195 connected to SRIO controller 170 via a SRIO bus.

Core processor 110 has a central processing unit operable to execute instructions and manipulate information. Data processing device 105 can include more than one core processor, and computations performed by data processing device 105 can be distributed amongst one or more of these core processors. Core processor 110 is connected to cache module 120, memory module 130, and coherency module 140 via a data bus labeled "DATA." In addition, memory module 130 is configured to store information that can be accessed and manipulated by core processor 110, DMA 160, coherency module 140, and other modules. Other memory modules (not illustrated) can be external to data processing device 105 and accessed via a memory controller 131, which can include a double data rate (DDR) memory interface or other type of memory interface. Cache module 120 can store information, such as a copy of information stored at memory module 130 or from an external memory, and generally can be accessed by core processor 110 more efficiently than from other memories. In an embodiment, information is exchanged via the data bus in blocks of a fixed size that correspond to a single cache-line accessed from cache module 120, or a minimum-size single access from memory module 130. Coherency module 140 maintains consistency between common information stored at cache module 120 and memory module 130.

Coherency module 140 is connected to crossbar switch 150 via a bus labeled "COH." Information can be exchanged across the COH bus in increments as small as a single byte. Crossbar switch 150 is configured to connect multiple inputs to multiple outputs in a matrix manner. Crossbar switch 150 is connected to DMA controller 160, and may also be connected to SRIO controller 170 and/or to PCI-E controller 180 via an AMBA AXI bus labeled "AXI." DMA controller 160 is configured to support certain hardware subsystems within data processor 105 to access memory resources independently of core processor 110. SRIO controller 170 provides a high-speed interface between data processing device 105 and an external peripheral device. SRIO controller 170 is another peripheral communications device operable to support high-speed communications between data processing device 105 and a similar controller at one or more peripheral devices, such as SRIO Peripheral device 195 via a bus labeled "SRIO." PCI-E controller 180 provides an interface between data processing device 105 and PCI-E peripheral device 190 which may be associated with another device, such as a microprocessor, a graphics adapter, a memory device, or the like, via a bus labeled "PCIEX." Additional devices (not shown) can be connected to crossbar switch 150.

An SRIO transaction can include a read or write transaction initiated by data processing device 105, which is directed at information storage locations at or accessible by an external data processing device such, as an SRIO peripheral device 180. An SRIO transaction can also include a read or write transaction initiated by an external data processing device, which is directed at information storage locations at or accessible by data processing device 105. For example, SRIO peripheral device 180 may initiate an SRIO read transaction, e.g., a request for information, via bus SRIO. SRIO controller 170 responds by accessing the requested information from one or more memory locations, and providing the requested information back to SRIO peripheral device 180 via bus SRIO. The requested information may be stored at a location local to data processing device 105, such as memory module 130 and cache module 120, or may be stored at a location external to data processing device 105 but accessible by data processing device 105, such as at another peripheral device connected via PCI-E controller 180 or at an external memory, or at a combination of locations. In addition, the requested information can be stored at both local and external locations. To illustrate selected embodiments of the present disclosure, SRIO transactions are described from the point of view of SRIO controller 170. For example, a read transaction is a request initiated by the data processing device 105 for delivery over the AXI bus to the SRIO controller 170 as an initiator request that is directed at SRIO peripheral device 195 as one or more target requests. As corresponding target responses from the SRIO peripheral device 195 are received at the SRIO controller 170, they are assembled (or re-ordered, if required) before being sent as responses to the data processing device 105 over the AXI bus.

To assist with the processing and control of information requests, the SRIO controller 170 includes an ordered queue 171 and static queue 172. The ordered and static queues 171, 172 form a single logical queue for storing requests and responses, and are architected for use in splitting initiator requests into multiple target requests, tracking the target responses, and assembling them to form initiator responses that are issued in order on the initiator interface.

The ordered queue 171 includes a plurality of N contiguous entry locations, e.g., accessed by contiguous addresses, numbered from zero to N−1 (ENTRY_LOC_0-ENTRY_LOC_N−1). Each entry location of ordered queue 171 has a fixed location relative to each other entry location, and ENTRY 0 can be referred to as the top entry location. In addition, each entry location includes a plurality of information fields, including information fields labeled "VALID," "SQ_PTR," and one or more additional ordered queue fields (e.g., OQ_F1, OQ_F2, etc.). The VALID field of each entry location can be a single memory bit and valid bit which is asserted when the entry location is allocated (e.g., the VALID entry location is associated with a request for information that has been received). The static queue pointer field (SQ_PTR) points to an entry in a paired static queue 172, and is configured to keep track of the status of SRIO transactions for managing in-order and out-of-order target responses associated with initiator requests issued by data processing device 105, and to facilitate providing responses from the source, e.g., SRIO peripheral 195. When implemented as a collapsible queue, all valid entries in the ordered queue 171 are maintained at the entry locations nearest the top of the queue so that if any entry is removed, all following entries are shifted up. For example, when the requested information associated with an entry location is retrieved and provided to the requesting source (a completion), the entry is de-allocated and all ordered queue 171 entries stored at entry locations below the deleted entry location are shifted up (e.g., toward the first entry location) so that all entry locations containing information are once again contiguous within the table. Since this shifting of entries consumes significant power, the entry fields and their width need to be minimized in the ordered queue 171.

The static queue 172 is provided to offload the required entry fields from the ordered queue 171 in a static structure where the entries do not shift. To this end, the static queue 172 includes a plurality of N entry locations which are accessed by entry addresses, numbered from zero to N (ENTRY_LOC_0-ENTRY_LOC_N−1). Each entry location of static queue 172 has a fixed location relative to each other entry location, and ENTRY 0 can be referred to as the top entry location. In addition, each entry location includes a plurality of information fields, including information fields labeled "VALID" and one or more additional static queue fields (e.g., SQ_F1, SQ_F2, etc.). To access the entry fields in the static queue 171, the static queue pointer field (SQ_PTR) in the ordered queue 171 is used to point to a corresponding static queue entry where the major data is stored. As a result, a minimum amount of data may be stored in the ordered queue 171 that is needed for ordering, and then the rest of the data is stored in the static queue 172 to help reduce power consumption.

Figure 3:
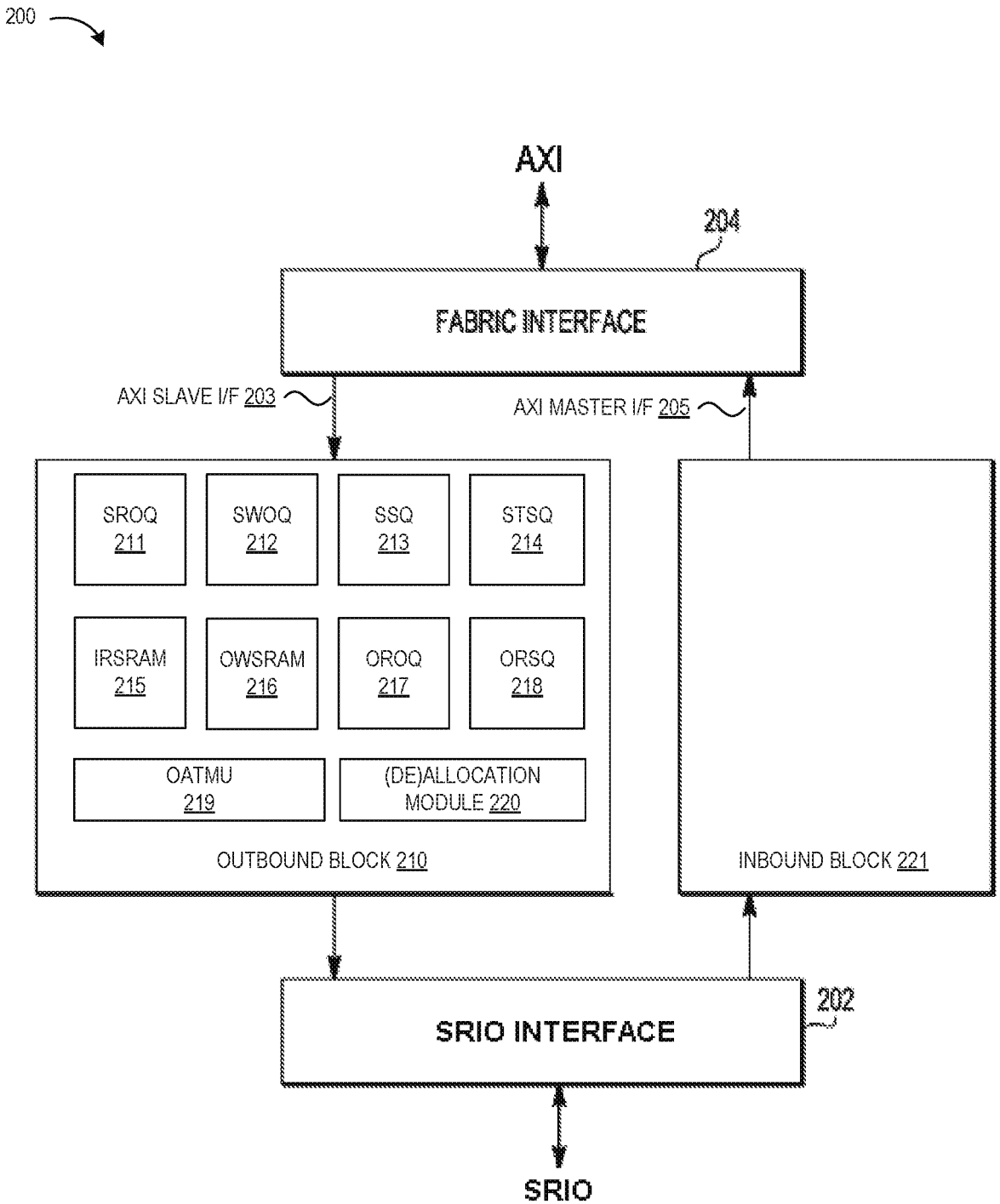
FIG. 3 is a block diagram illustrating the SRIO controller of FIG. 2 in accordance with selected embodiments of the present disclosure.

FIG. 3 is a block diagram 200 illustrating a SRIO controller 170 of FIG. 2 in accordance with selected embodiments of the present disclosure. SRIO controller 200 includes a generic bus interface module (SRIO INTERFACE 202), an AXI fabric interface module 204, an inbound block 221, and an outbound block 210. Outbound block 210 includes a slave read ordered queue module (SROQ) 211, a slave write ordered queue module (SWOQ) 212, a slave static queue module (SSQ) 213, a slave transaction ID static queue module (STSQ) 214, an inbound read data SRAM module (IRSRAM) 215, an outbound write data SRAM module (OWSRAM) 216, an outbound request ordered queue module (OROQ) 217, an outbound request static queue module (ORSQ) 218, an outbound address translation mapping unit (OATMU) 219, and an allocation/deallocation module 220. In selected embodiments, the IRSRAM 215 and OWSRAM 216 can be combined to form a unified SRAM in order to save area. SRIO interface module 202 is connected to bus SRIO, and has an output connected to inbound block 221 and an input connected to outbound block 210. Fabric interface module 204 is connected to bus AXI, and has an input connected to the AXI master interface 205 from the inbound block 221, and has an output connected to the AXI slave interface 203 for the outbound block 210.

During operation, the SRIO controller 200 can be used to move data between external SRIO peripheral device 195 and device-interconnect connected masters (e.g., core 110 and DAM 160) and/or slaves (e.g., memory 130). In particular, the SRIO controller 200 is connected with device system interconnect 150 over the AMBA AXI bus, and with the external SRIO peripheral device 195 on the SRIO bus. SRIO controller 170 is effectively a bridge IP translating between AXI and SRIO protocols. In selected embodiments, the SRIO controller 170 supports SRIO outbound transactions (Slave AXI to SRIO) with the outbound block 210, and also supports inbound transactions (SRIO to Master AXI) with the inbound block 221. In both cases, the AXI bus has separate read and write channels, which means that read and write transactions can occur independently and simultaneously.

The operation of the SRIO controller 200 will now be described with reference to the various queue modules 211-220 of the output bound block 210, though it will be appreciated that the inbound block 221 can be considered as mirrored to the outbound block 210, except that it handles inbound SRIO transactions. In particular, the outbound block 210 uses the OROQ module 217 and ORSQ module 218 to store information for sending outbound or target request transactions on the SRIO interface 202. For these requests, the OWSRAM module 216 is used to store outbound write data, and the IRSRAM module 215 is used to store inbound read data (i.e., read data corresponding to a read transaction on the Slave AXI interface 213). In addition, the SROQ module 211, SWOQ module 212, SSQ module 213, and STSQ module 214 are used to store information for handling responses to the AXI slave interface 203. In particular, the SROQ module 211 stores a slave AXI read transaction, and the SWOQ module 212 stores slave AXI write transaction information. The SSQ module 213 and STSQ module 214 are unified for both read and write operations. The SROQ module 211, SWOQ module 212, and SSQ module 213 each have the same number of entries, while the STSQ module 214 has 4 times as many entries since a single AXI transaction can be split into a maximum of four SRIO transactions due to the difference in transaction attribute characteristics of both the protocols. In selected embodiments, the outbound block 210 may also include an outbound address translation mapping unit (OATMU) 219 which is configured to translate addresses from AXI to SRIO and provide it to outbound and slave queues. In operation, the entry locations at the tables 211-219 are allocated and deallocated by the (de) allocation module 220 to generate entries that correspond to the transaction requests from the fabric interface 204 which may be split into multiple target requests that are sent out over the SRIO interface 202 and received back as out-of-order target responses for reassembly as in-order responses sent back over the fabric interface 204.

FIGS. 4-8 illustrate a sequence of example information values stored at the outbound ordered and static queues at incremental stages of illustrative read and write transactions received from the data processing device 105 of FIG. 2 in accordance with selected embodiments of the present disclosure. In an initial state 300 of the ordered and static queues 301-306 depicted in FIG. 4, the information values stored in the queues reflect a situation where three transactions are received on the AXI slave interface (namely a first read transaction IA, a second read transaction IB, and a third write transaction IC), but none of the transactions have been sent on the SRIO interface. This initial status is reflected by storing information values in the entry fields of the ordered and static queues 301-306. To this end, each of the ordered queues—e.g., the slave read ordered queue (SROQ) 301, slave write ordered queue (SWOQ) 302, outbound request ordered queue (OROQ) 305, an outbound request static queue (ORSQ) 306—includes a plurality of N entries, each entry including a VLD field (indicating whether the contents for that entry are valid), a RDY field (indicating that a particular entry is ready to be scheduled from the queue). In addition, each entry in the SROQ 301 and SWOQ 302 includes a static queue pointer field (SQ_PTR) which points to an entry in a paired slave static queue (SSQ) 303. In order to assist with ordering AXI transactions, the SROQ 301 entries may include an ARID field which corresponds to a read AXI id, and the SWOQ 302 may include an AWID field which corresponds to a write AXI id.

In the paired slave static queue (SSQ) 303, the plurality of N entries are used to store data fields associated with a corresponding read and write entries in the ordered SROQ 301 and SWOQ 302, respectively. Each SSQ entry includes a VLD field, a plurality of counter fields (for tracking transaction status information), and an error field (e.g., ERR). In selected example embodiments, three counter fields are included in each SSQ entry for tracking 4 segments, as single AXI transaction can be segmented into 4 SRIO transactions. A first counter field (e.g., SEG_MAX_CTR) indicates the total number of split segments generated from a particular AXI transaction. In addition, a second counter field (e.g., SEG_SENT_CTR) is used to keep track of outbound request segments sent on SRIO interface. In operation, the second counter field is incremented whenever a segment is sent on the SRIO interface. Finally, a third counter field (e.g., SEG_RCVD_CTR) is used to keep track of inbound responses received on the SRIO interface. In operation, the third counter field is incremented whenever a segment is received on the SRIO interface. When all the counter fields have the same value, this signifies that responses to all the segments from the SRIO have been received, at which point the RDY field is set in the SROQ 301 or SWOQ 302 to send a response on the slave AXI interface. Three separate counters are needed because the SRIO protocol supports logical retry, which means that the peripheral device on the other side of SRIO can request the SRIO controller 200 to re-send a request segment. As for the error field ERR, this is used to indicate whether an error was received on an SRIO response. When configured as a sticky bit, the ERR bit will remain set once an error response is received on any of the segments from the same group so that an error response can be sent for corresponding AXI transaction. Though not shown, each entry in the slave static queue (SSQ) may also have a size field (e.g., SIZE) that includes information about SRIO transaction size for all the 4 segments. The SIZE field is used in conjunction with the SEG field in the outbound request ordered queue (OROQ) 305.

In the slave transaction ID static queue (STSQ) 304, the plurality of 4N−1 entries are used to co-relate multiple SRIO segments to a single AXI transaction. To this end, each STSQ entry includes a VLD field, a first pointer field (e.g., SLV_SQ_PTR) that points to an entry number in the SSQ 303, a second pointer field (e.g., OR_SQ_PTR) that points to an entry number in the ORSQ 306, and a segments field (e.g., SEGS_1) that may be a four-bit one hot field that identifies the SRIO segment from a group of segments. With the segments field, a segment in an outbound request queue ORSQ 306 may be enabled for logical retry operations (e.g., when re-sending SRIO segment). In the STSQ 304, multiple entries can have the same SLV_SQ_PTR value to enable multiple SRIO segments to be co-related with a single AXI transaction.

In the outbound request ordered queue (OROQ) 305, the plurality of N entries are used to store a minimal amount of information in the ordered queue structure for sending target requests on the SRIO interface. To this end, each OROQ entry includes a VLD field, a RDY field, a segments field (e.g., SEGS), a priority field (e.g., PRIO), and a first pointer field (e.g., OR_SQ_PTR) that points to an entry number in the ORSQ 306. In selected embodiments, the segments field SEGS may be implemented as a 5 bit value having a most significant bit which indicates that the SRIO segment size is less than 8 bytes, with the remaining 4 bits indicating which segments are enabled. In addition, the 3-bit wide priority field PRIO may correspond to a 1-bit critical request flow (CRF) and 2-bit priority for the SRIO protocol header. The valid (VLD) and ready (RDY) fields in each OROQ entry arbitrate with the PRIO value to schedule outbound transactions according to the SRIO protocol. In the OROQ 305, one entry may be reserved for each priority, and the remaining entries may be non-reserved. In this way, scheduling is not delayed if a specific priority is not available from SRIO interface by allowing a different priority transaction to be sent as per SRIO protocol. Note that the PRIO field is ordering with respect to SRIO protocol, but any relevant field can be used instead of PRIO, for any other protocol in the queue for ordering requirement.

In the outbound request static queue (ORSQ) 306, the plurality of N entries are used to store additional information in the static queue structure for sending target requests on the SRIO interface. To this end, each ORSQ entry includes a VLD field, and a header field (e.g., HDR). In selected embodiments, the header field HDR has a predetermined size (e.g., 105 bits wide) that may be used as part of header in an SRIO transaction. Though not shown, the ORSQ 306 may also include a pointer field (e.g., SLV_SQ_PTR) that points to an entry number in the SSQ 303 and that is sent to the STSQ 304 for storage when a request is sent on the SRIO.

Figure 4:
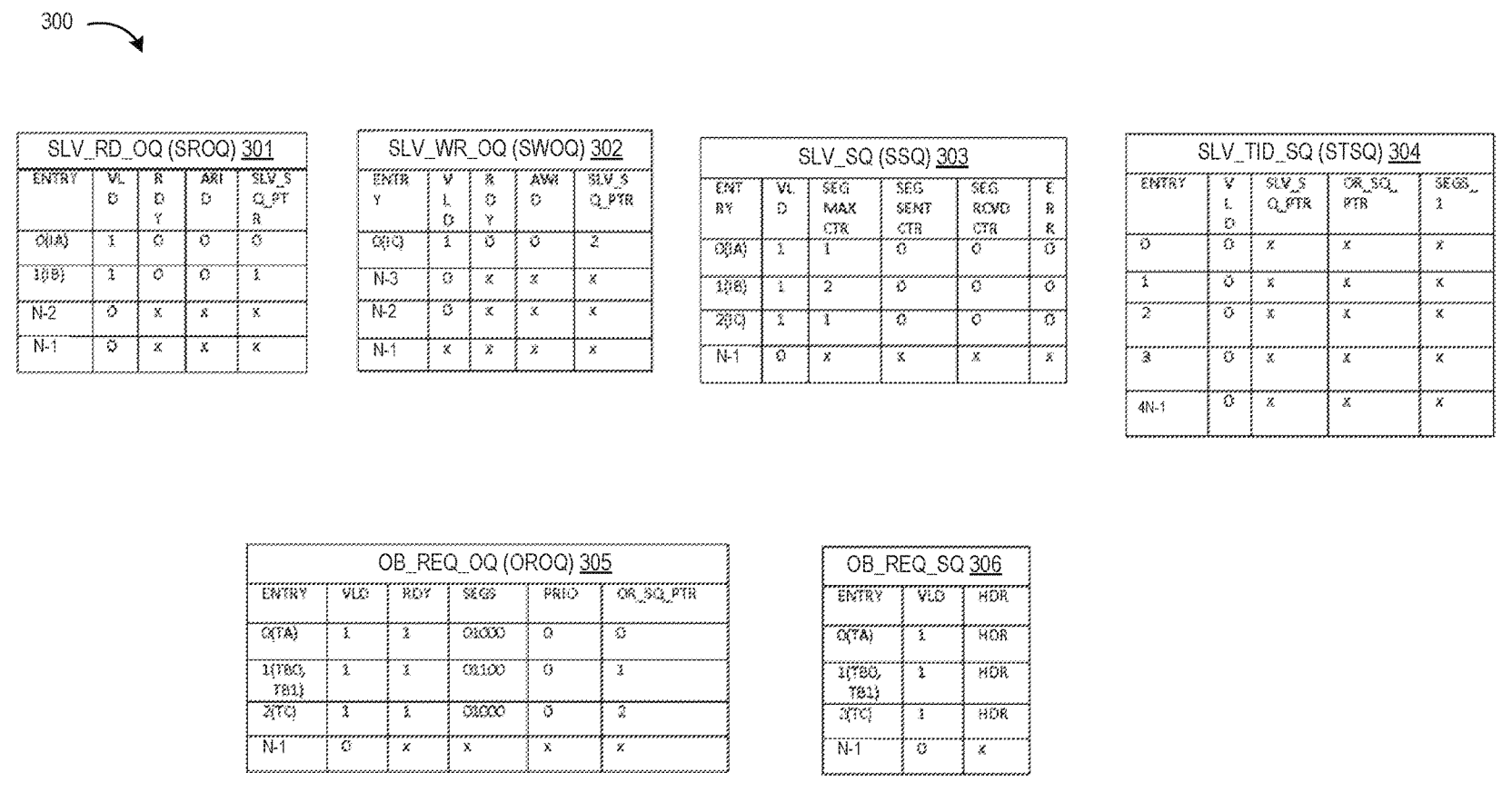

In FIG. 4, the queues 301-306 are shown with a set of stored values which are loaded to illustrate an example situation where three AXI transactions are received on the AXI slave interface 203, including two AXI read transactions (e.g., IA and IB) and an AXI write transaction (e.g., IC) which are all identified with the AXI ID 0. As a result, the response for the read transaction IB should not be sent before the response for the read transaction IA, but the response for the write transaction IC can be sent independently of the IA and IB responses since the IC transaction is on a write channel, unlike the IA and IB transactions which are on a read channel. For this example, the IB response cannot be sent before the IA response because both have same AXI ID 0. However, it will be appreciated that the IB response can be sent ahead of the IA response if their respective AXI ID values are different, as per AXI protocol ordering. Thus, the initiator response order is not limited by the scheme to strict order of received request.

Continuing with the example values shown in FIG. 4, it is assumed that the IA (read) and IC (write) transactions are both 256-byte transactions and the IB (read) transaction is a 15-byte transaction. Though not shown, the size field SIZE in the SSQ 303 has size information for all segments. With these assumed sizes, the IA and IC transactions will each correspond, respectively, to SRIO transactions TA and TC of 256 bytes. However, the IB transaction will be split into two SRIO transactions, namely, TB0 of size 8 bytes and TB1 of size 7 bytes. As a result, the outbound queues (OROQ 305 and ORSQ 306) are updated by populating the corresponding entries 0-2 with entry values. In addition to setting the VLD and RDY bits, the SEGS fields in the OROQ 305 for entry 0(TA) and entry 2(TC) will have a value 01000 which means only one segment needs to be sent on the SRIO interface. However, the SEGS field for entry 1(TB0,TB1) has value 01100 which means that two segments need to be sent on the SRIO interface, namely, TB0 with size 8 bytes and TB1 with size 7 bytes. As will be appreciated, if an AXI transaction that is less than 8 bytes is split into multiple SRIO segments, then the most significant bit of the SEGS field in the OROQ 305 will be set. While the priority field PRIO in the OROQ 305 is shown as having the same value for all three entries, it will be appreciated that different priority values can be assigned for different entries.

In operation, the valid field bit VLD in the OROQ 305 is set when AXI transactions are received when the entry is inserted in the OROQ 305. In addition, the ready field bit RDY is used for write transaction, since write data can come independent of write address on AXI interface. In particular, the ready field bit RDY is set when all data has been received in the outbound write data SRAM (OWSRAM) for an AXI write transaction IC. Conversely, the inbound read data SRAM module (IRSRAM) may be used to store read data from received inbound SRIO response for SRIO read transactions (TA,TB0,TB1), and to send the read data to the AXI read data channel for AXI read transactions (IA,IB). Finally, SRIO header data (HDR) may be inserted into the ORSQ 306.

In the illustrated SROQ 301, entries 0 and 1 are populated with AXI read transaction information IA and IB, and entry 0 in the SWOQ 302 is populated with write transaction IC. In addition, the entries in the SSQ 303 are populated with both AXI read and write information. In particular, entry 0(IA) and entry 2(IC) of the SSQ 303 each have a SEG_MAX_CTR value 1 as they correspond to single SRIO segment. However, entry 1(IB) has a SEG_MAX_CTR value 2 as it corresponds to 2 SRIO segments TB0 and TB1. Though not shown, the SSQ SIZE field in each entry may be populated with corresponding segment size values. At this stage, the STSQ 304 empty, but will be populated with values whenever the SRIO segment is sent out on SRIO interface.

Figure 5:
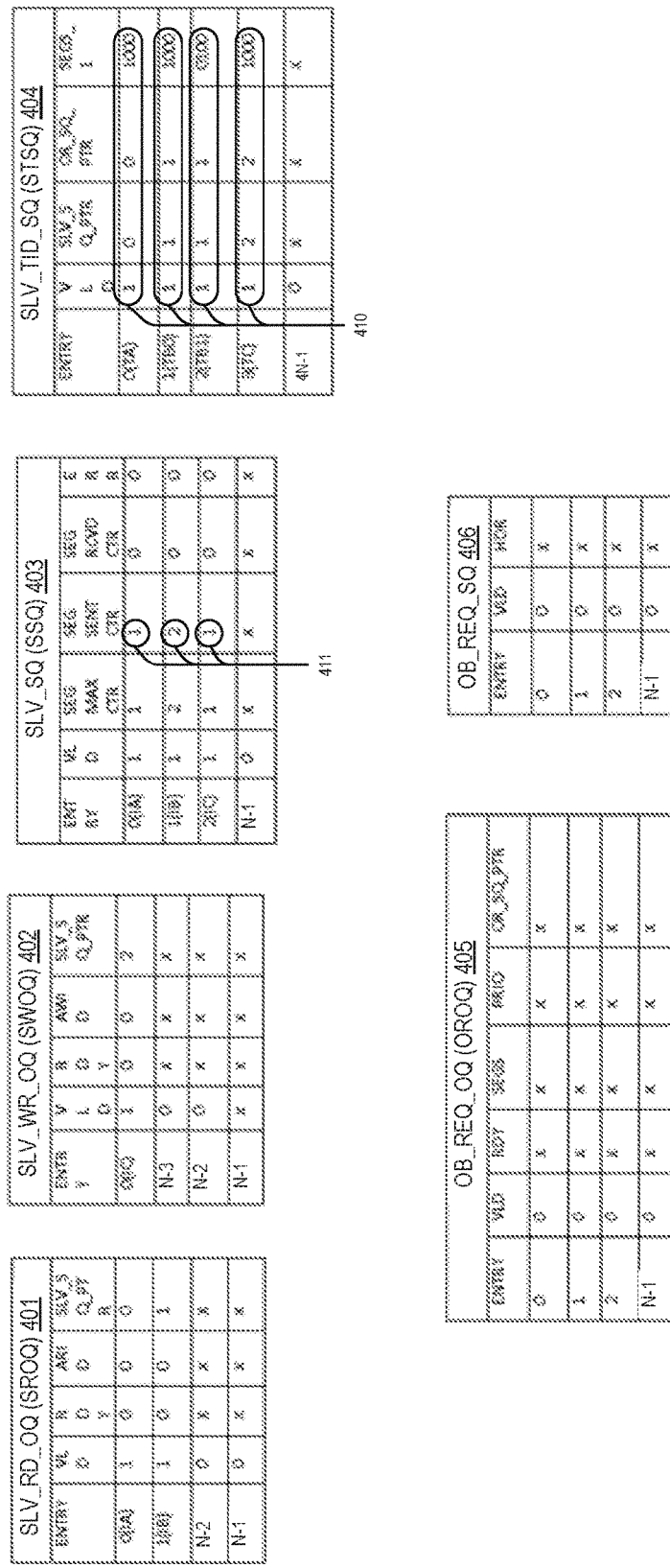

Turning now to FIG. 5, there is shown a subsequent state 400 of the ordered and static queues 401-406 in which the information values stored in the queues reflect a situation after all the SRIO segments are sent out so that the read transactions IA, IB, and a write transaction IC have all been sent as target requests over the SRIO interface. At this point, the OROQ 405 and ORSQ 406 are empty, having cleared the previously stored information values from the queues 305, 306. In addition and as indicated with updated field values 410, the STSQ 404 is populated with four entries (0-3) corresponding, respectively, to four segments (TA, TB0, TB1. TC) that were sent on the SRIO. As each STSQ entry is written, its VLD field is set and the remaining pointer and segment fields (SLV_SQ_PTR, OR_SQ_PTR, SEGS_1) are configured with corresponding values. In the STSQ 404, the entry number is used as a transaction ID in the header of SRIO transaction. In particular, the value stored in the SLV_SQ_PTR field in the STSQ 404 points to an entry number in the SSQ 403, while the value stored in the OR_SQ_PTR field in the STSQ 404 points to an entry number in the ORSQ 406. As illustrated, entry 0(TA) and entry 3(TC) each have unique SLV_SQ_PTR values (e.g., 0 and 2), but entry 1(TB0) and 2(TB1) has same value 1 that points to a common entry 1(IB) in SSQ 403. With this arrangement, multiple SRIO split segments can be co-related to a single AXI transaction. In the STSQ 404, the SEGS_1 field is populated with one hot enabled segment bit location for each entry, i.e., it indicates SRIO segment location in 1 of 4 segments. In addition, the OR_SQ_PTR field in the STSQ 404 points to an entry number in ORSQ 406. This pointer field OR_SQ_PTR and the SEGS_1 field are used to enable a segment entry in OROQ 405 for logical retry to be set in response from SRIO. In addition and as indicated with updated field values 411, each entry of the SSQ 403 also has the second counter field (e.g., SEG_SENT_CTR) updated to keep track of the SRIO segments sent out for that entry.

Figure 6:
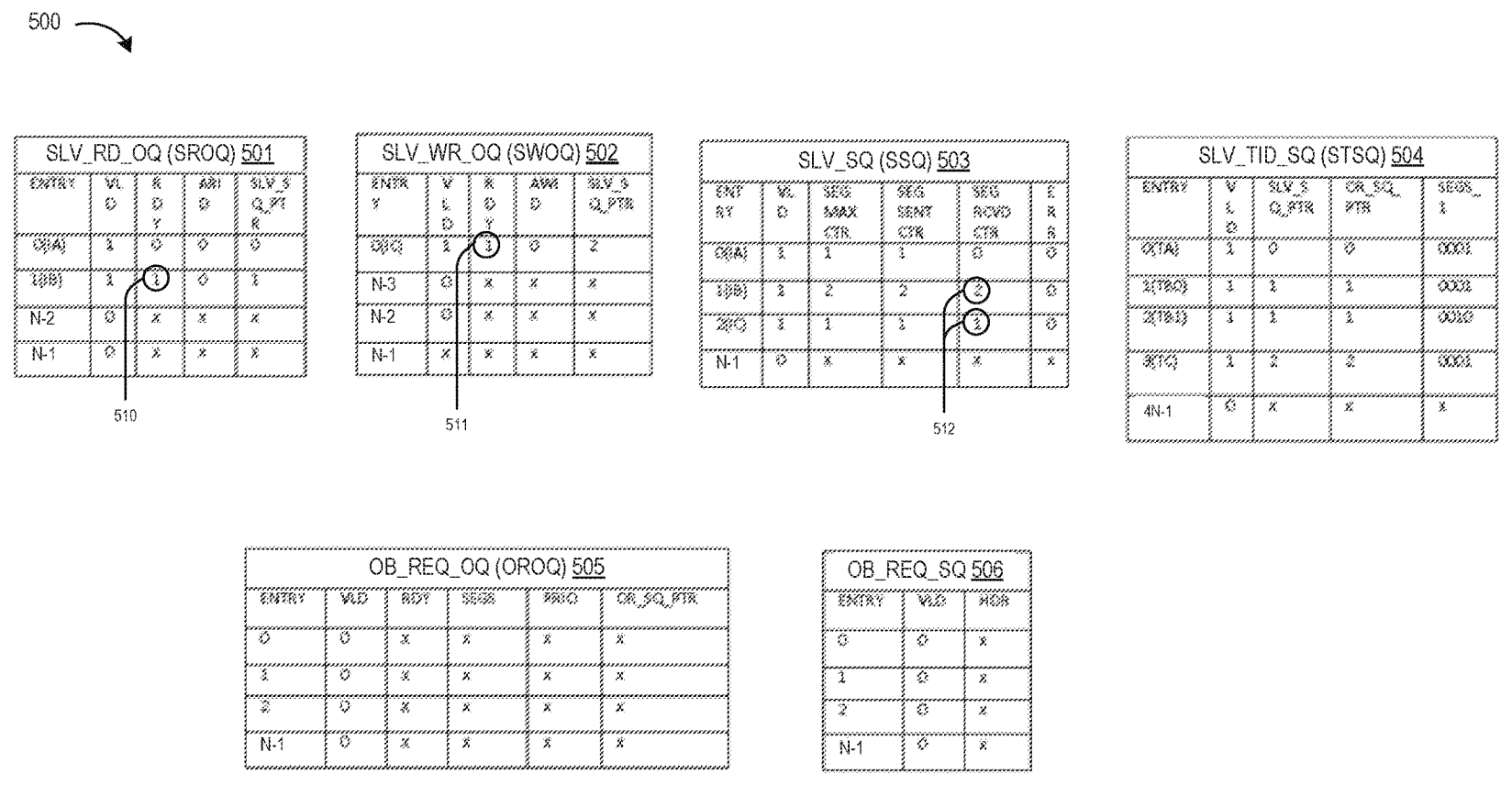

While the SRIO segments may be sent out over the SRIO interface in a first ordered sequence (e.g., TA, TB0, TB1. TC), the SRIO protocol requires support for processing responses that are received out-of-order from the request order, such as when the first ordered transaction sequence TA, TB0, TB1, TC is sent on SRIO interface, but the resulting inbound SRIO response sequence is TB1, TB0, TC, TA. This situation is shown in FIG. 6 which shows a subsequent state 500 of the ordered and static queues 501-506 in which the information values stored in the queues reflect a situation where the inbound SRIO responses for TB1, TB0, TC have been received, but not the inbound response for TA. In particular, whenever an inbound SRIO response is received, the transaction ID in the response header is looked up against the entry number in the STSQ 504 to get entry information, and the corresponding STSQ SLV_SQ_PTR from that entry in the STSQ 504 is used to increment the SEG_RCVD_CTR field in the SSQ 503 as indicated with updated field values 512. With all three counters for entry 1(IB) in the SSQ 503 having the same value (e.g., 2) and all three counters for entry 2(IC) in the SSQ 503 having the same value (e.g., 1), this means that all SRIO segment responses have been received for these entries. At this point, the SROQ 501 and SWOQ 502 are looked up with the SLV_SQ_PTR, and the RDY field is set (e.g., 1) for the entries corresponding to IB and IC as indicated with updated field values 510, 511. While the AXI response for write transaction IC can be sent independently of the read transactions IA and IB, the AXI response for read transaction IB cannot be sent since read transaction IA is not ready yet. At this point, the error field ERR in the SSQ 503 may be updated if an error is received in the response.

Figure 7:
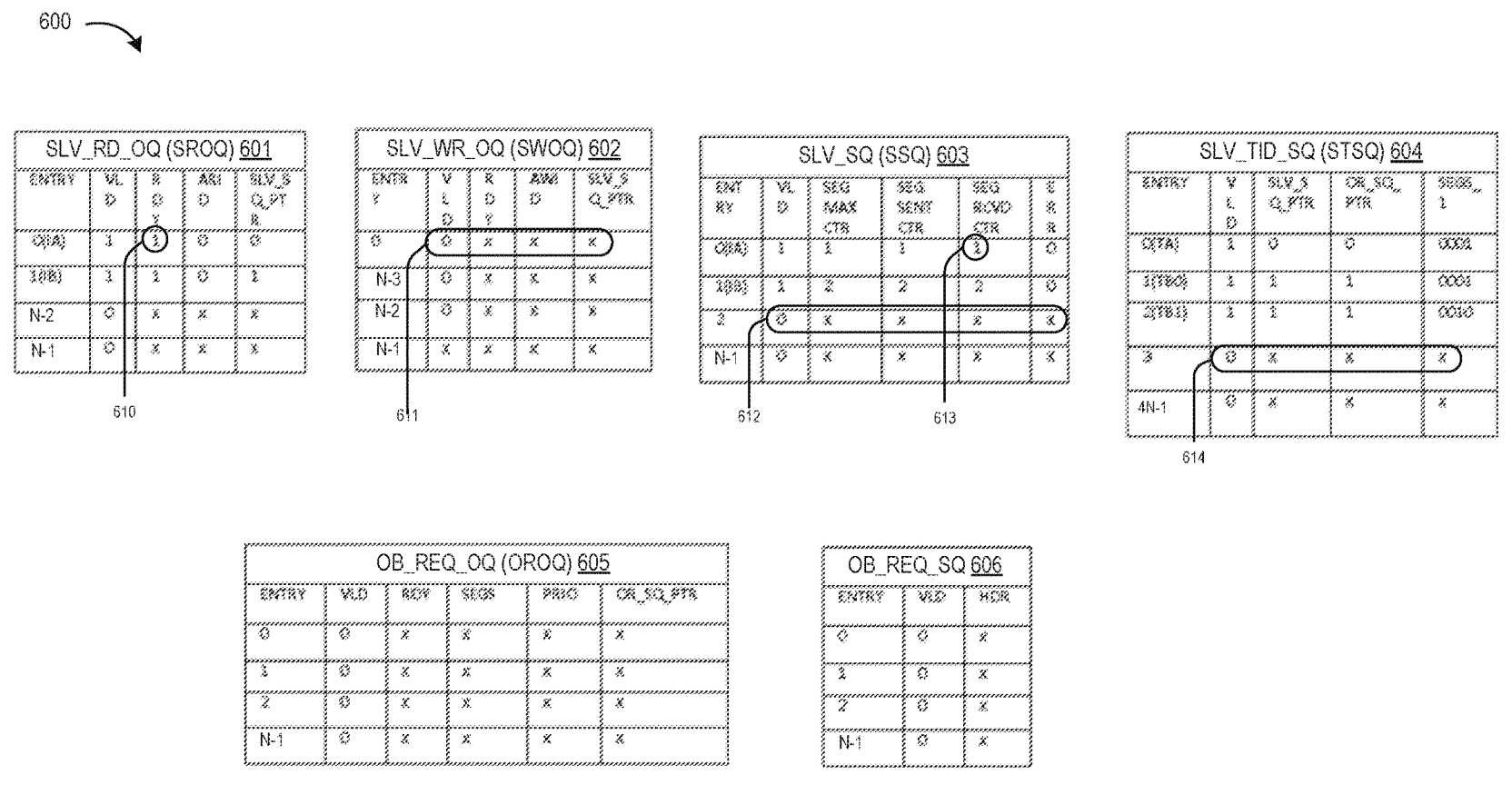

Turning now to FIG. 7, there is shown a subsequent state 600 of the ordered and static queues 601-606 in which the information values stored in the queues reflect a situation after the response for IC has been sent on the AXI slave interface. At this point and as indicated with updated field values 612, 614, the entries for transaction IC are deleted from all the slave queues, including the SSQ 603 (entry 2) and the STSQ 604 (entry 3). In addition and as indicated with updated field value 613, the SSQ 603 is updated to increment the third counter field (e.g., SEG_RCVD_CTR) to reflect that the inbound SRIO response for TA has been received, so all slave queues are updated. In addition and as indicated with updated field value 610, the RDY field is set for IA in the SROQ 601 to indicate that the response for IA can be sent on AXI. Once the response for IC is sent, the corresponding entry (0) in the SWOQ 602 may also be cleared as indicated with updated field value 611.

Figure 8:
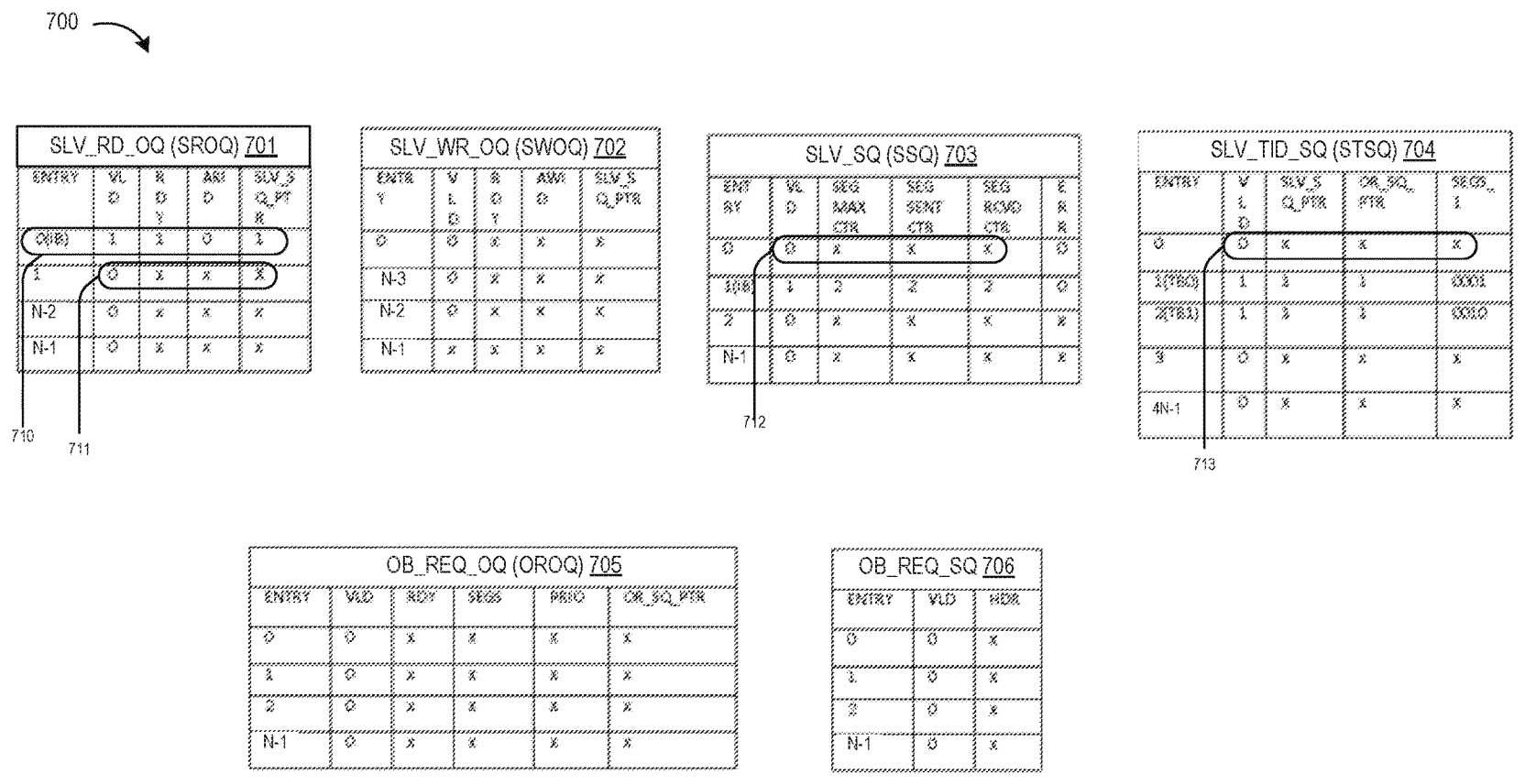

Turning now to FIG. 8, there is shown a subsequent state 700 of the ordered and static queues 701-706 in which the information values stored in the queues reflect a situation after the response for IA has been sent on the AXI slave interface. At this point and as indicated with updated field values 712, 713, the entries for transaction IA are deleted from all slave queues, including the SSQ 703 (entry 0) and the STSQ 704 (entry 0). In addition and as indicated with updated field values 710, 711, the SROQ 701 is updated to remove the entry for transaction IA (entry 0), thereby moving the remaining entries up one position in the SROQ 701. Subsequently, the response for transaction IB will be sent as well, thus completing all three transactions as per AXI ordering requirement.

Figure 9:
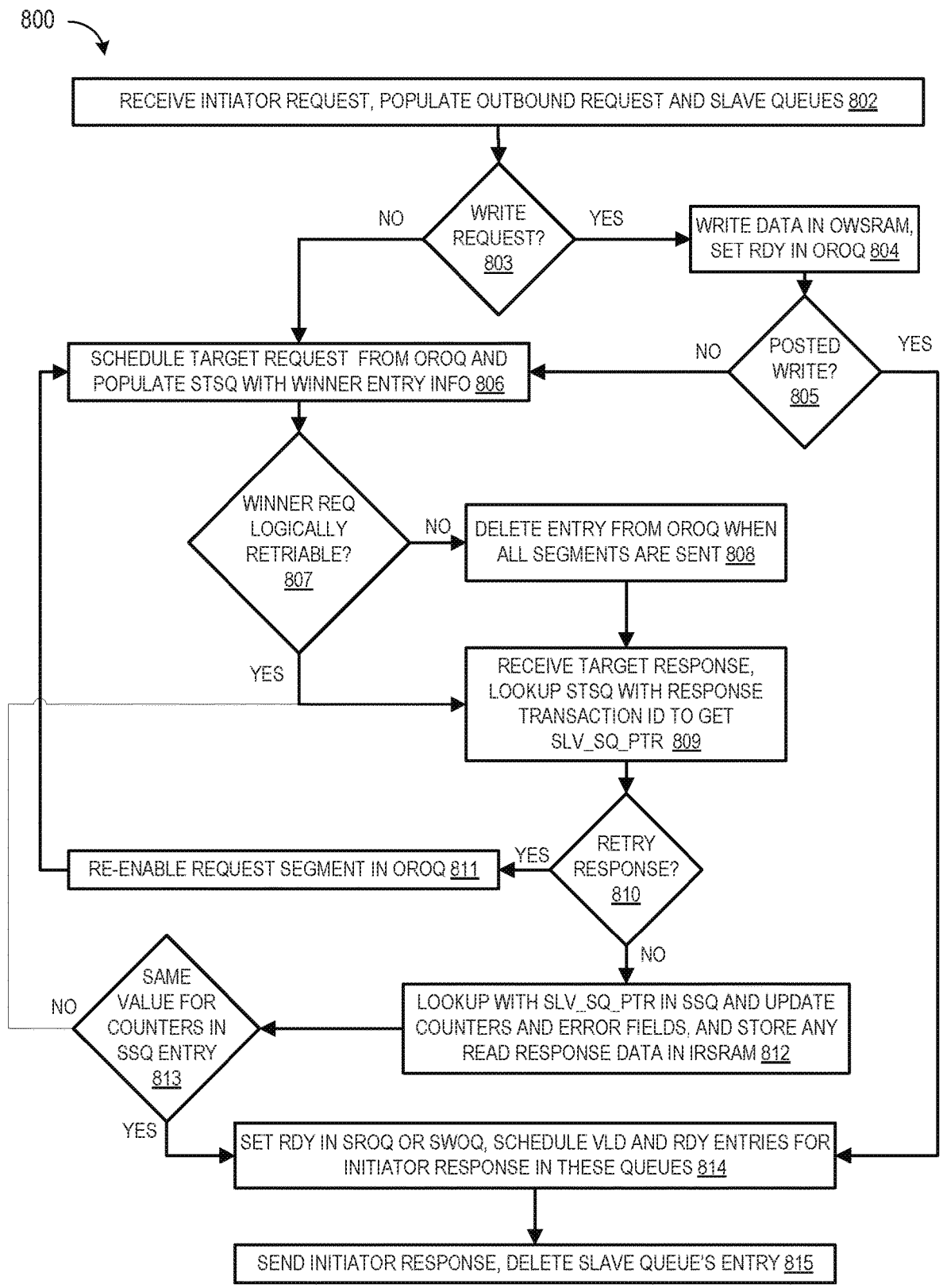
FIG. 9 is a simplified flow chart showing the logic for a sequence of events for a single initiator transaction in accordance with selected embodiments of the present disclosure.

To provide additional details for an improved understanding of selected embodiments of the present disclosure, reference is now made to FIG. 9 which depicts a simplified flow chart 900 showing the logic for a sequence of events for a single initiator transaction in accordance with selected embodiments of the present disclosure. In an example embodiment, the control logic and methodology shown in FIG. 9 may be implemented as hardware and/or software on an SRIO controller 170 in accordance with selected embodiments of the present disclosure. The control sequence begins at step 802 when an initiator request is received, e.g., an SRIO read transaction from data processing device 105. Based on information specified in the initiator request, the outbound queues (e.g., 305-306) and slave queues (e.g., 301-304) are each populated with a corresponding entry field values so that each ordered queue (e.g., 301) includes a static queue pointer value to a corresponding entry in an paired static queue (e.g., 303). In this way, the initiator request may be stored in a first set of ordered and static queues (e.g., for an AXI interface) and also correlated with a corresponding target request that is stored in second set of ordered and static queues (e.g., for an SRIO interface).

At step 803, the control sequence determines if the initiator request is a write transaction (affirmative outcome to detection step 803) or read transaction (negative outcome to detection step 803). If a read transaction is detected (negative outcome to detection step 803), then the control sequence proceeds to step 806 where a corresponding target request is scheduled. However, if a write transaction is detected (affirmative outcome to detection step 803), then the control sequence proceeds to step 804 where the write data is stored in the outbound write data SRAM (OWS-RAM) and the ready bit RDY is set in the outbound request ordered queue (OROQ). If the write request transaction is posted (affirmative outcome to detection step 805), then the control sequence proceeds direction to step 814 (described hereinbelow). But for write request transactions that are not posted (negative outcome to detection step 805), the control sequence proceeds to step 806.

At step 806, the target request corresponding to the received initiator request is scheduled for processing. In selected embodiments, the scheduling is performed by populating the slave transaction ID static queue (STSQ) with information corresponding to the target request, such as one or more static queue pointers (e.g., SLV_SQ_PTR, OR_SQ_PTR) along with a segments field (e.g., SEGS_1).

At step 807, the control sequence determines if the winning request is logically retriable. If it is retriable (affirmative outcome to detection step 807), then the control sequence leaves the outbound request ordered queue (OROQ) entry in place, and proceeds to step 809 for processing. However, if the request is not retriable (negative outcome to detection step 803), then the control sequence proceeds to step 808 where the corresponding entry from the outbound request ordered queue (OROQ) is deleted once all the segments for the target request(s) are sent.

At step 809, the control sequence detects that a target response is received from the SRIO interface and then uses the response transaction ID to look up the slave transaction ID static queue (STSQ) and retrieve the slave static queue pointer. If the received response indicates it is a retry response (affirmative outcome to detection step 810), then the control sequence proceeds to step 811 to re-enable the request segment in the outbound request ordered queue module (OROQ). However, if the request is not a retry response (negative outcome to detection step 810), then the control sequence proceeds to step 812.

At step 812, the control sequence uses the slave pointer field (e.g., SLV_SQ_PTR) to perform a lookup for the corresponding entry in the slave static queue (SSQ) so that the counters (and any error fields) can be updated. At this point, any read response data received with the target response is stored in the inbound read data SRAM (IRSRAM).

At step 813, the control sequence detects whether all of the counters for the corresponding entry in the slave static queue (SSQ) have the same value, indicating that target responses have been received for all target requests. If all target responses have not been received (negative outcome to detection step 813), then the control sequence returns to step 809 to await the next (missing) target response(s). However, if the counter values have the same value (affirmative outcome to detection step 813), then the response is ready to be returned, and the control sequence proceeds to step 814.

At step 814, the applicable ordered queue (SROQ or SWOQ) is prepared for sending the initiator response by setting the RDY bit in the corresponding entry, depending on whether this is a read or write transaction. In addition, the VLD and RDY entries are scheduled for response the applicable ordered queue.

At step 815, the control sequence sends the initiator response, and the corresponding entries in the slave queues (SROQ, SWOQ, SSQ. STSQ) are deleted.

Figure 10:
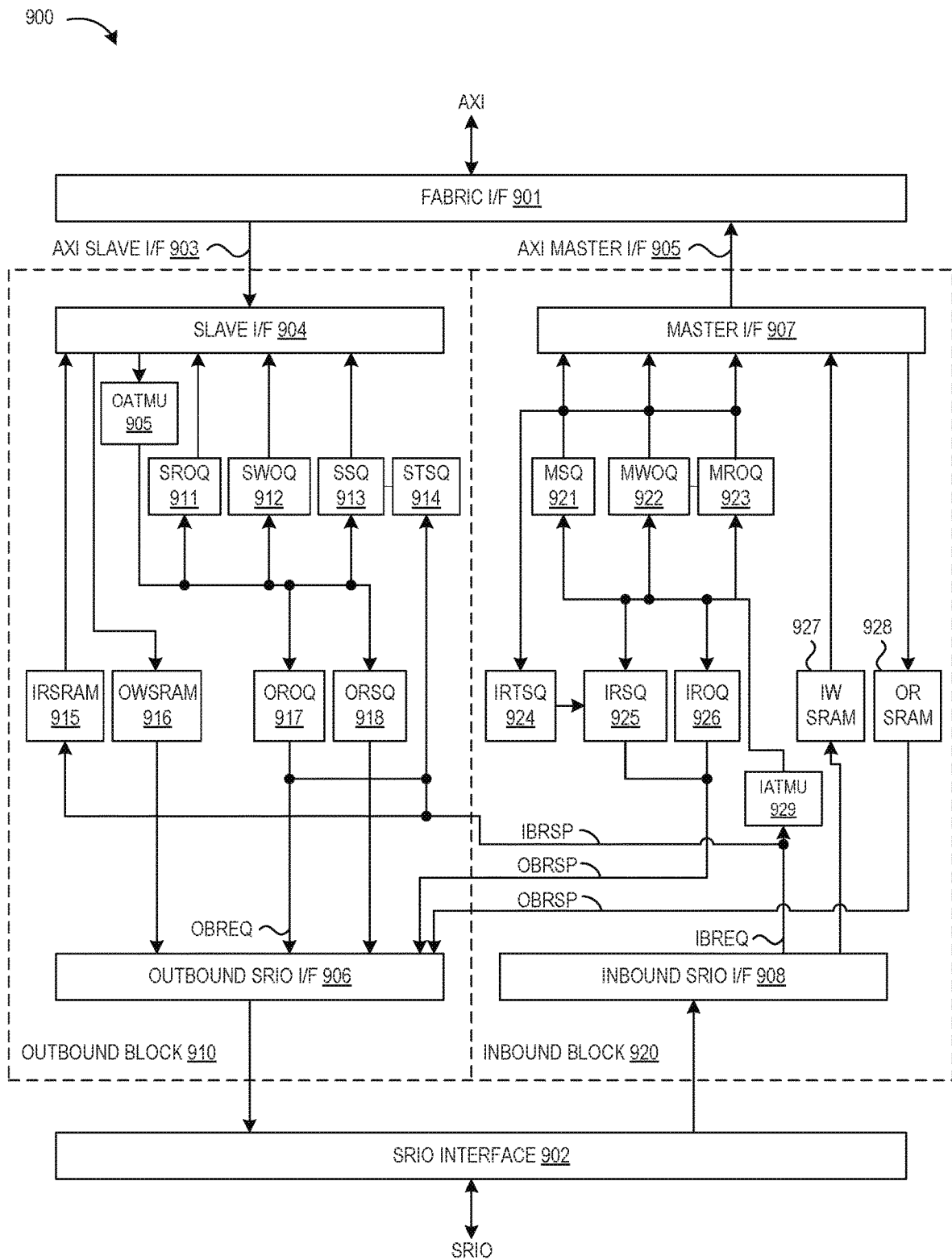
FIG. 10 is block diagram illustrating additional details of the SRIO controller in accordance selected hardware embodiments of the present disclosure.

To provide additional details for an improved understanding of selected embodiments of the present disclosure, reference is now made to FIG. 10 which is a block diagram illustrating additional details of an SRIO controller 900 in accordance selected hardware embodiments of the present disclosure. The SRIO controller 900 includes a fabric interface module 901, an SRIO bus interface module 902, an outbound block 910, and an inbound block 920. Outbound portion 910 receives read or write initiator requests originating from the data processing device 105 via bus AXI, and issues one or more target requests via bus SRIO. Target responses to these requests are received via bus SRIO and inbound portion 920 is configured to provide the requested information back to the data processing device via bus AXI. Outbound block 910 and inbound block 920 are functionally similar to each other, but operating in reverse so that the inbound block 920 can be considered as mirrored to the outbound block 910, except that it handles inbound SRIO transactions. Inbound portion 920 receives read or write requests originating outside of data processing device 105 via bus SRIO, and issues one or more local transactions at data processing device 105 via bus AXI. Responses to these requests are received from data processing device 105 via bus AXI and outbound portion 910 is configured to provide the requested information back to the originating external device via bus SRIO.

Outbound block 910 includes an outbound slave interface module 904, an outbound address translation mapping unit (OATMU) 905, a slave read ordered queue (SROQ) 911, a slave write ordered queue (SWOQ) 912, a slave static queue (SSQ) 913, a slave transaction ID static queue (STSQ) 914, an inbound read data SRAM (IRSRAM) 915, an outbound write data SRAM (OWSRAM) 916, an outbound request ordered queue (OROQ) 917, an outbound request static queue (ORSQ) 918, and an outbound SRIO interface module 906, connected as shown.

Inbound block 920 includes an inbound SRIO interface module 908, a master static queue (MSQ) 921, a master write ordered queue (MWOQ) 922, a master read ordered queue (MROQ) 923, an inbound request transaction static queue (IRTSQ) 924, an inbound request static queue (IRSQ) 925, an inbound request ordered queue (IROQ) 926, an inbound write SRAM (IWSRAM) 927, an outbound read SRAM (ORSRAM) 928, and an inbound address translation mapping unit (IATMU) 929, connected as shown. In operation, the inbound block 920 receives inbound SRIO transactions from SRIO interface 902 at the inbound SRIO interface 908 which forwards inbound requests IBREQ to the IATMU 929 (for address translation) and IBRSP to the outbound block 910 for storage of inbound response at the inbound read data SRAM (IRSRAM) 915. The IATMU 929 sends requests to the master queues 921-923 and to the inbound request queues 924-926. The master read ordered queue (MROQ) 923 stores each read transaction while the master write ordered queue (MWOQ) 922 stores each write transaction for the AXI master interface 907. Analogous to the slave static queue, the master static queue (MSQ) 921 is a unified read and write transaction queue. Master AXI transactions are scheduled from the master queues 921-923. In addition, inbound request transaction static queue (IRTSQ) 924, inbound request static queue (IRSQ) 925, and inbound request ordered queue (IROQ) 926 handle sending outbound responses OBRSP on the output SRIO interface 906. Inbound write SRAM (IWSRAM) 927 stores SRIO inbound write data, and outbound read SRAM (ORSRAM) 928 stores read data for outbound response corresponding to inbound request. IWSRAM 927 and ORSRAM 928 can be shared to save area. The flow of transaction from inbound SRIO interface 908 to master AXI interface 907 is similar to outbound flow described above.

SRIO interface module 902 is connected to inbound SRIO interface module 908, which together are configured to provide an interface between the SRIO bus and logic blocks of inbound block 920. Inbound SRIO interface module 908 is connected to IATMU 929 and IWSRAM 927. IATMU 929 is configured to receive requests from inbound SRIO interface module 908 to determine whether the address associated with the request corresponds to a memory-mapped module of data processing device 105, and if so, perform an address translation and provide the translated address to the master static queue (MSQ) 921, master write ordered queue (MWOQ) 922, master read ordered queue (MROQ) 923, inbound request static queue (IRSQ) 925, and inbound request ordered queue (IROQ) 926. IWSRAM 927 is configured to store inbound write data.

By now it should be appreciated that there has been provided an apparatus, method, program code, and system for reordering out of order responses from decomposed requests in an integrated circuit protocol bridge circuit. In the disclosed embodiments, the integrated circuit protocol bridge circuit receives a first ordered initiator request in an initiator interface protocol identifying first information to be returned in-order to a requesting device. In selected embodiments, the initiator interface protocol is an AXI protocol. In other embodiments, the first ordered initiator request is received as a read request or a write request over an AXI slave interface. In addition, the protocol bridge circuit allocates, to the first ordered initiator request, entries in a first ordered queue and a first static queue forming a first logical queue for the initiator interface protocol, where the first ordered queue includes entries for storing a plurality of ordered initiator requests in order of receipt, and where each entry in the first ordered queue includes a first pointer which points to a corresponding entry in the first static queue. The protocol bridge circuit also generates a first plurality of split target requests in a target interface protocol from the first ordered initiator request, each split target request corresponding to a respective portion of the first information. In selected embodiments, the target interface protocol is a serial rapid input/output bus (SRIO) protocol. In other embodiments, the split target requests are transmitted as read or write requests over an SRIO interface. Upon generating the split target requests, the protocol bridge circuit allocates the first plurality of split target requests to entries in a second ordered queue and a second static queue forming a second logical queue for the target interface protocol, where the second ordered queue includes a plurality of entries for storing a plurality of ordered target requests in order of receipt, and where each entry in the second ordered queue includes a second pointer which points to a corresponding entry in the second static queue. In addition, the protocol bridge circuit may allocate, to the first plurality of split target requests, entries in a third static queue for the initiator interface protocol, where the third static queue comprises a plurality of entries for storing a plurality of ordered target requests, each entry comprising a first pointer which points to a corresponding entry in the first static queue and a second pointer which points to a corresponding entry in the second static queue. Subsequently, the protocol bridge circuit receives a plurality of out-of-order target responses in response to the first plurality of split target requests. However, an allocated entry in the first ordered queue for the first ordered initiator request is deleted only after a plurality of counter fields in the first static queue indicate that target responses have been received for all of the first plurality of split target requests.

In another form, there is provided a device, method, program code, and system for reordering out of order responses from decomposed AXI requests at an SRIO protocol bridge controller circuit. In the disclosed embodiments, the device includes a logical transaction request queue and an allocation module. In selected embodiments, the logical transaction request queue includes a first static hardware queue having a first plurality of unshifting entries, where each unshifting entry stores major data associated with a corresponding transaction request. Each unshifting entry in the first static hardware queue may include an entry number field, a valid indicator field indicating if the entry is valid, a first counter field indicating a total number of segments for a corresponding transaction request, a second counter field indicating a current number of segments from the corresponding transaction request that have been sent over a target protocol interface, and a third counter field indicating a current number of segments from the corresponding transaction request that have been received over the target protocol interface. Alternatively, each unshifting entry in the first static hardware queue may include an entry number field, a valid indicator field indicating if the entry is valid, and a header field storing header information for a transaction request sent over the target protocol interface. The logical transaction request queue also includes a first ordered hardware queue having a second plurality of shifting entries for storing a plurality of ordered initiator transaction requests in order of receipt, where each shifting entry in the first ordered hardware queue includes a first pointer which points to a corresponding shifting entry in the first static hardware queue. Each shifting entry in the first ordered hardware queue may include an entry number field, a valid indicator field indicating if the entry is valid, a ready field indicating if the entry is ready for scheduling, an identification field identifying a transaction request received at an initiator protocol interface, and the first pointer. Alternatively, each shifting entry in the first ordered hardware queue may include an entry number field, a valid indicator field indicating if the entry is valid, a ready field indicating if the entry is ready for scheduling, a segments field indicating segment size and count information for a transaction request sent over the target protocol interface, and the first pointer. In selected embodiments, the first static hardware queue and the first ordered hardware queue in the logical transaction request queue form a first logical queue for an initiator interface protocol (e.g., an AXI protocol). In addition, the logical transaction request queue may also include a second ordered hardware queue and a second static hardware queue forming a second logical queue for a target interface protocol (e.g., an SRIO protocol), where the second static hardware queue stores a third plurality of unshifting entries which each store major data associated with a corresponding target requests, where the second ordered hardware queue comprises a fourth plurality of shifting entries for storing a plurality of target requests, and where each entry in the second ordered hardware queue includes a second pointer which points to a corresponding entry in the second static hardware queue. In addition, the logical transaction request queue may include a third static hardware queue comprising a fifth plurality of unshifting entries which are separately allocated to the multiple target transaction requests, where each of the fifth plurality of unshifting entries includes a third pointer which points to a corresponding entry in the first static hardware queue and a fourth pointer which points to a corresponding entry in the second static hardware queue. In other embodiments, the logical transaction request queue may include a first logical queue formed with the first static hardware queue and the first ordered hardware queue for read transaction requests received over the initiator protocol interface. In addition, the logical transaction request queue may include a second logical queue formed with a second static hardware queue and a second ordered hardware queue for write transaction requests received over the initiator protocol interface, where the second static hardware queue stores a third plurality of unshifting entries which each store major data associated with a corresponding target write transaction request, where the second ordered hardware queue comprises a fourth plurality of shifting entries for storing a plurality of target write transaction requests, and where each entry in the second ordered hardware queue comprises a second pointer which points to a corresponding entry in the second static hardware queue. In addition, the logical transaction request queue may include a third logical queue formed with a third ordered hardware queue and a third static hardware queue for the target protocol interface, where the third static hardware queue stores a fifth plurality of unshifting entries which each store major data associated with a corresponding target requests, where the third ordered hardware queue comprises a sixth plurality of shifting entries for storing a plurality of target requests, and where each entry in the third ordered hardware queue comprises a third pointer which points to a corresponding entry in the third static hardware queue.

In the disclosed allocation module, entries in the first static hardware queue and first ordered hardware queue are allocated for processing an ordered initiator transaction request received at an initiator protocol interface that identifies first information to be returned in-order to a requesting device and that is split into multiple target transaction requests that are processed out-of-order over a target protocol interface as a plurality of target responses, where the allocation module shifts an entry for the ordered initiator transaction request in the first ordered hardware queue only after the plurality of target responses associated with the ordered initiator transaction request are received over the target protocol interface. To this end, the allocation module may be configured to allocate, to the ordered initiator transaction request, entries in the first ordered hardware queue and the first static hardware queue; to generate a plurality of split target requests in the target interface protocol from the ordered initiator request, each split target request corresponding to a respective portion of the first information; to allocate the first plurality of split target requests to entries in the second ordered hardware queue and a second static hardware queue; to receive the plurality of target responses in response to the first plurality of split target requests, where the plurality of target responses are received out of order; and to delete an allocated entry in the first ordered hardware queue for the first ordered initiator request only after a plurality of counter fields in the first static hardware queue indicate that target responses have been received for all of the first plurality of split target requests.

In yet another form, there is provided a method, apparatus, program code, and system for operating a serial rapid input/output bus (SRIO) controller. In the disclosed embodiments, the SRIO controller receives a plurality of ordered initiator requests from an AXI protocol interface which include a first ordered initiator request identifying first information to be returned in-order to a requesting device. In response, the SRIO controller allocates, to the first ordered initiator request, entries in a first ordered hardware queue and a first static hardware queue forming a first logical queue for the AXI protocol interface, where the first static hardware queue includes unshifting entries which each store major data associated with a corresponding initiator request, where the first ordered hardware queue includes a plurality of shifting entries for storing a plurality of ordered initiator requests in order of receipt, and where each shifting entry in the first ordered hardware queue includes a first pointer which points to a corresponding entry in the first static hardware queue. In addition, the SRIO controller generates a first plurality of split target requests from the first ordered initiator request to be sent over an SRIO protocol interface, where each split target request corresponding to a respective portion of the first information. For the first plurality of split target requests, the SRIO controller allocates a first entry in a second ordered hardware queue and a first entry in a second static hardware queue forming a second logical queue for the SRIO protocol interface, where the second static hardware queue includes an unshifting entry which stores major data associated with the first plurality of split target requests, and where the second ordered hardware queue includes a shifting entry which stores minor data associated with the first plurality of split target requests, including a second pointer which points to a corresponding entry in the second static hardware queue. After sending the first plurality of split target requests over the SRIO protocol interface, the SRIO controller allocates, to the first plurality of split target requests, a corresponding first plurality of unshifting entries in a third static hardware queue, where each unshifting entry in the third static hardware queue includes a third pointer which points to a corresponding entry in the first static hardware queue and a fourth pointer which points to a corresponding entry in the second static hardware queue. After receiving a plurality of out-of-order target responses from the SRIO protocol interface in response to the first plurality of split target requests, the SRIO controller deletes an allocated entry in the first ordered hardware queue for the first ordered initiator request only after a plurality of counter fields in the first static hardware queue indicate that the first plurality of target responses have been received for all of the first plurality of split target requests. In selected embodiments, each shifting entry in the first ordered hardware queue may include a first entry number field, a first valid indicator field indicating if the shifting entry is valid, a first ready field indicating if the shifting entry is ready for scheduling, a first identification field identifying a read or write transaction request received at the AXI protocol interface, and the first pointer. In addition, each unshifting entry in the first static hardware queue may include a second entry number field, a second valid indicator field indicating if the unshifting entry is valid, a first counter field indicating a total number of segments for a corresponding read or write transaction request, a second counter field indicating a current number of segments from the corresponding read or write transaction request that have been sent over the SRIO protocol interface, and a third counter field indicating a current number of segments from the corresponding read or write transaction request that have been received over the SRIO protocol interface. In addition, each shifting entry in the second ordered hardware queue may include a third entry number field, a third valid indicator field indicating if the shifting entry is valid, a third ready field indicating if the shifting entry is ready for scheduling, a segments field indicating segment size and count information for a transaction request sent over the SRIO protocol interface, and the second pointer.

Although the described exemplary embodiments disclosed herein are directed to methods and systems for reordering out of order responses from decomposed requests with reference to an SRIO controller, the present invention is not necessarily limited to the example embodiments illustrate herein, and various embodiments of the circuitry and methods disclosed herein may be implemented with other devices and circuit components. For example, the techniques disclosed herein are applicable to other internal and peripheral interface modules in addition to their use at a SRIO peripheral device, e.g., PCI-E controller. Wherein the disclosed techniques have been described with regard to an SRIO read and write transactions initiated by the data processing device 105, it will be appreciated that these techniques can also be applied in other situations. For example, these techniques can be used to provide transaction confirmation information during a non-posted SRIO write transaction initiated by SRIO peripheral device 195. And while a single SRIO controller 170 is illustrated at data processing device 105, it will be appreciated that the data processing device 105 can include more than one SRIO controller, each SRIO controller having a dedicated interface bus. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method, comprising:
receiving, at an integrated circuit protocol bridge circuit, a first ordered initiator request in an initiator interface protocol identifying first information to be returned in-order to a requesting device;
allocating, to the first ordered initiator request, entries in a first ordered queue and a first static queue forming a first logical queue for the initiator interface protocol, where the first ordered queue comprises a plurality of entries for storing a plurality of ordered initiator requests in order of receipt, and where each entry in the first ordered queue comprises a first pointer which points to a corresponding entry in the first static queue;
generating a first plurality of split target requests in a target interface protocol from the first ordered initiator request, each split target request corresponding to a respective portion of the first information;
allocating the first plurality of split target requests to entries in a second ordered queue and a second static queue forming a second logical queue for the target interface protocol, where the second ordered queue comprises a plurality of entries for storing a plurality of ordered target requests in order of receipt, and where each entry in the second ordered queue comprises a second pointer which points to a corresponding entry in the second static queue;
receiving a plurality of target responses in response to the first plurality of split target requests, where the plurality of target responses are received out of order; and deleting an allocated entry in the first ordered queue for the first ordered initiator request only after a plurality of counter fields in the first static queue indicate that target responses have been received for all of the first plurality of split target requests.

2. The method of claim 1, where the initiator interface protocol comprises an AXI protocol.

3. The method of claim 1, where the target interface protocol comprises a serial rapid input/output bus (SRIO) protocol.

4. The method of claim 1, where receiving the first ordered initiator request comprises receiving a read request over an AXI slave interface.

5. The method of claim 1, where receiving the first ordered initiator request comprises receiving a write request over an AXI slave interface.

6. The method of claim 1, where the first plurality of split target requests are transmitted as read requests over an SRIO interface circuit.

7. The method of claim 1, where the first plurality of split target requests are transmitted as write requests over an SRIO interface circuit.

8. The method of claim 1, further comprising:
allocating, to the first plurality of split target requests, entries in a third static queue for the initiator interface protocol, where the third static queue comprises a plurality of entries for storing a plurality of ordered target requests, each entry comprising a third pointer which points to a corresponding entry in the first static queue and a fourth pointer which points to a corresponding entry in the second static queue.

9. A device comprising:
a logical transaction request queue comprising:
a first static hardware queue comprising a first plurality of unshifting entries, where each unshifting entry stores major data associated with a corresponding transaction request, and
a first ordered hardware queue comprising a second plurality of shifting entries for storing a plurality of ordered initiator transaction requests in order of receipt, where each shifting entry in the first ordered hardware queue comprises a first pointer which points to a corresponding shifting entry in the first static hardware queue; and
an allocation module to allocate entries in the first static hardware queue and first ordered hardware queue for processing an ordered initiator transaction request received at an initiator protocol interface circuit that identifies first information to be returned in-order to a requesting device and that is split into multiple target transaction requests that are processed out-of-order over a target protocol interface circuit as a plurality of target responses, where the allocation module shifts an entry for the ordered initiator transaction request in the first ordered hardware queue only after the plurality of target responses associated with the ordered initiator transaction request are received over the target protocol interface circuit.

10. The device of claim 9, where the logical transaction request queue comprises:
the first static hardware queue and the first ordered hardware queue forming a first logical queue for an initiator interface protocol; and
a second ordered hardware queue and a second static hardware queue forming a second logical queue for a target interface protocol, where the second static hardware queue stores a third plurality of unshifting entries which each store major data associated with a corresponding target requests, where the second ordered hardware queue comprises a fourth plurality of shifting entries for storing a plurality of target requests, and where each entry in the second ordered hardware queue comprises a second pointer which points to a corresponding entry in the second static hardware queue.

11. The device of claim 10, where the allocation module is configured to:
allocate, to the ordered initiator transaction request, entries in the first ordered hardware queue and the first static hardware queue;
generate a plurality of split target requests in the target interface protocol from the ordered initiator request, each split target request corresponding to a respective portion of the first information;
allocate the first plurality of split target requests to entries in the second ordered hardware queue and a second static hardware queue;
receive the plurality of target responses in response to the first plurality of split target requests, where the plurality of target responses are received out of order; and
delete an allocated entry in the first ordered hardware queue for the first ordered initiator request only after a plurality of counter fields in the first static hardware queue indicate that target responses have been received for all of the first plurality of split target requests.

12. The device of claim 9, where the logical transaction request queue comprises:
the first static hardware queue and the first ordered hardware queue forming a first logical queue for read transaction requests received over the initiator protocol interface circuit;
a second static hardware queue and a second ordered hardware queue forming a second logical queue for write transaction requests received over the initiator protocol interface circuit, where the second static hardware queue stores a third plurality of unshifting entries which each store major data associated with a corresponding target write transaction request, where the second ordered hardware queue comprises a fourth plurality of shifting entries for storing a plurality of target write transaction requests, and where each entry in the second ordered hardware queue comprises a second pointer which points to a corresponding entry in the second static hardware queue; and
a third ordered hardware queue and a third static hardware queue forming a third logical queue for the target protocol interface circuit, where the third static hardware queue stores a fifth plurality of unshifting entries which each store major data associated with a corresponding target requests, where the third ordered hardware queue comprises a sixth plurality of shifting entries for storing a plurality of target requests, and where each entry in the third ordered hardware queue comprises a third pointer which points to a corresponding entry in the third static hardware queue.

13. The device of claim 10, where the initiator interface protocol comprises an AXI protocol and where the target interface protocol comprises a serial rapid input/output bus (SRIO) protocol.

14. The device of claim 10, where the logical transaction request queue comprises a third static hardware queue comprising a fifth plurality of unshifting entries which are separately allocated to the multiple target transaction requests, where each of the fifth plurality of unshifting entries comprises a third pointer which points to a corresponding entry in the first static hardware queue and a fourth pointer which points to a corresponding entry in the second static hardware queue.

15. The device of claim 9, where each shifting entry in the first ordered hardware queue comprises an entry number field, a valid indicator field indicating if the entry is valid, a ready field indicating if the entry is ready for scheduling, an identification field identifying a transaction request received at the initiator protocol interface circuit, and the first pointer.

16. The device of claim 9, where each unshifting entry in the first static hardware queue comprises an entry number field, a valid indicator field indicating if the entry is valid, a first counter field indicating a total number of segments for a corresponding transaction request, a second counter field indicating a current number of segments from the corresponding transaction request that have been sent over the target protocol interface circuit, and a third counter field indicating a current number of segments from the corresponding transaction request that have been received over the target protocol interface.

17. The device of claim 9, where each shifting entry in the first ordered hardware queue comprises an entry number field, a valid indicator field indicating if the entry is valid, a ready field indicating if the entry is ready for scheduling, a segments field indicating segment size and count information for a transaction request sent over the target protocol interface circuit, and the first pointer.

18. The device of claim 9, where each unshifting entry in the first static hardware queue comprises an entry number field, a valid indicator field indicating if the entry is valid, and a header field storing header information for a transaction request sent over the target protocol interface circuit.

19. A method of operating a serial rapid input/output bus (SRIO) controller circuit comprising:
receiving, at the SRIO controller circuit, a plurality of ordered initiator requests from an AXI protocol interface circuit comprising a first ordered initiator request identifying first information to be returned in-order to a requesting device;
allocating, to the first ordered initiator request, entries in a first ordered hardware queue and a first static hardware queue forming a first logical queue for the AXI protocol interface circuit, where the first static hardware queue comprises unshifting entries which each store major data associated with a corresponding initiator request, where the first ordered hardware queue comprises a plurality of shifting entries for storing a plurality of ordered initiator requests in order of receipt, and where each shifting entry in the first ordered hardware queue comprises a first pointer which points to a corresponding entry in the first static hardware queue;
generating, by the SRIO controller circuit, a first plurality of split target requests from the first ordered initiator request to be sent over an SRIO protocol interface circuit, each split target request corresponding to a respective portion of the first information;
allocating, to the first plurality of split target requests, a first entry in a second ordered hardware queue and a first entry in a second static hardware queue forming a second logical queue for the SRIO protocol interface circuit, where the second static hardware queue comprises an unshifting entry which stores major data associated with the first plurality of split target requests, and where the second ordered hardware queue comprises a shifting entry which stores minor data associated with the first plurality of split target requests, including a second pointer which points to a corresponding entry in the second static hardware queue;
sending, over the SRIO protocol interface circuit, the first plurality of split target requests;
allocating, to the first plurality of split target requests, a corresponding first plurality of unshifting entries in a third static hardware queue, each unshifting entry in the third static hardware queue comprising a third pointer which points to a corresponding entry in the first static hardware queue and a fourth pointer which points to a corresponding entry in the second static hardware queue;
receiving, from the SRIO protocol interface circuit, a plurality of target responses in response to the first plurality of split target requests, where the plurality of target responses are received out of order; and
deleting an allocated entry in the first ordered hardware queue for the first ordered initiator request only after a plurality of counter fields in the first static hardware queue indicate that the first plurality of target responses have been received for all of the first plurality of split target requests.

20. The method of claim 19,
where each shifting entry in the first ordered hardware queue comprises a first entry number field, a first valid indicator field indicating if the shifting entry is valid, a first ready field indicating if the shifting entry is ready for scheduling, a first identification field identifying a read or write transaction request received at the AXI protocol interface circuit, and the first pointer;
where each unshifting entry in the first static hardware queue comprises a second entry number field, a second valid indicator field indicating if the unshifting entry is valid, a first counter field indicating a total number of segments for a corresponding read or write transaction request, a second counter field indicating a current number of segments from the corresponding read or write transaction request that have been sent over the SRIO protocol interface circuit, and a third counter field indicating a current number of segments from the corresponding read or write transaction request that have been received over the SRIO protocol interface circuit;
where each shifting entry in the second ordered hardware queue comprises a third entry number field, a third valid indicator field indicating if the shifting entry is valid, a third ready field indicating if the shifting entry is ready for scheduling, a segments field indicating segment size and count information for a transaction request sent over the SRIO protocol interface circuit, and the second pointer.

* * * * *